United States Patent [19]
Floyd et al.

[11] Patent Number: 5,290,580
[45] Date of Patent: Mar. 1, 1994

[54] COOLING PROCESS FOR PERISHABLE FOOD AND HORTICULTURAL PRODUCTS

[75] Inventors: Stan L. Floyd, Enumclaw; Herbert D. Muise, Tumwater; Mark A. Stanish, Seattle, all of Wash.

[73] Assignee: Weyerhaeuser Company, Tacoma, Wash.

[21] Appl. No.: 843,471

[22] Filed: Feb. 27, 1992

Related U.S. Application Data

[63] Continuation-in-part of Ser. No. 577,990, Sep. 5, 1990.

[51] Int. Cl.⁵ .............................................. A23B 4/100
[52] U.S. Cl. .................................... 426/524; 426/393; 426/411; 426/419; 62/304; 53/127
[58] Field of Search ............... 426/393, 411, 419, 524; 62/304, 340, 371, 372; 53/127, 440

[56] References Cited

U.S. PATENT DOCUMENTS

| | | | |
|---|---|---|---|
| Re. 21,144 | 7/1939 | Dodge | 426/396 |
| 880,414 | 2/1908 | Sprague | 426/419 |
| 1,828,179 | 10/1931 | Gallagher | 62/372 |
| 1,853,719 | 4/1932 | Bradbury | 426/109 |
| 2,164,025 | 6/1939 | Schwertfeger | 99/171 |
| 2,467,268 | 4/1949 | Merkle | 426/109 |
| 2,496,731 | 2/1950 | Longo | 62/86 |
| 2,684,907 | 7/1954 | Brunsing | 99/193 |
| 2,774,230 | 12/1956 | Kasser | 62/169 |
| 3,309,206 | 2/1956 | Daniels | 99/192 |
| 3,795,749 | 3/1974 | Cummin et al. | 426/316 |
| 3,890,762 | 6/1975 | Ernst et al. | 53/440 |
| 4,001,443 | 1/1977 | Dave | 426/106 |
| 4,294,079 | 10/1981 | Benson | 62/372 |
| 4,910,032 | 3/1990 | Antoon, Jr. | 426/118 |
| 4,943,440 | 7/1990 | Armstrong | 426/392 |
| 5,079,934 | 1/1992 | Vinokurov | 62/304 |
| 5,088,293 | 2/1992 | Itou . | |

FOREIGN PATENT DOCUMENTS

| | | |
|---|---|---|
| 2115529 | 7/1929 | Australia . |
| 2115629 | 7/1929 | Australia . |
| 261930 | 3/1988 | European Pat. Off. . |
| 337860 | 10/1989 | European Pat. Off. . |
| 2631610 | 11/1989 | France . |
| 2031 | of 1899 | United Kingdom . |
| 1264484 | 2/1972 | United Kingdom . |

*Primary Examiner*—Helen F. Pratt
*Attorney, Agent, or Firm*—Klarquist, Sparkman, Campbell, Leigh & Whinston

[57] ABSTRACT

Products are placed in proximity to a liquid holding cooling element containing a volatile liquid and are subjected to a vacuum. The evaporation of the liquid from the cooling element enhances cooling while reducing the evaporation of liquid from the product.

12 Claims, 2 Drawing Sheets

COOLING PROCESS FOR PERISHABLE FOOD AND HORTICULTURAL PRODUCTS

This is a continuation-in-part of Ser. No. 07/577,990, entitled "A METHOD OF PACKING PERISHABLE FOOD OR HORTICULTURAL PRODUCTS", filed Sep. 5, 1990, with Stan Louis Floyd, et al. as inventors; Ser. No. 07/577,993, entitled "A PACKAGE FOR PERISHABLE FOOD AND HORTICULTURAL PRODUCTS", filed Sep. 5, 1990, with Stan Louis Floyd, et al. as inventors; Ser. No. 07/754,671, entitled "A PACKAGE FOR PERISHABLE FOOD AND HORTICULTURAL PRODUCTS", filed Sep. 4, 1991, with Stan Louis Floyd, et al. as inventors; and Ser. No. 07/754,978, entitled "A METHOD OF PACKING PERISHABLE FOOD OR HORTICULTURAL PRODUCTS", filed Sep. 4, 1992, with Stan Louis Floyd, et al. as inventors.

BACKGROUND OF THE INVENTION

The present invention relates to a process for cooling perishable products and, in particular, to a process which does not require moisture resistant product containers.

Several methods are commonly used for cooling perishable products where rapid cooling is required. These include hydrocooling, vacuum cooling, icing and forced air refrigeration.

In the produce field, it is common to pick heads of lettuce and place them in waxed boxes with the box of lettuce then being hosed down with water either before or after the boxes are loaded onto a truck. Although evaporation of water from the lettuce during transportation assists in cooling the lettuce, relatively insignificant amounts of water are absorbed by the waxed boxes and cooling is limited. Transportation of broccoli in waxed boxes filled with ice is also known.

In addition, vacuum cooling approaches have been used for cooling produce. In accordance with this cooling technique, the warm product is loaded into an airtight chamber or tube which is subsequently evacuated by a mechanical or steam-ejector vacuum pump to establish a partial vacuum therein. As the total gas pressure in the tube is reduced below the saturation pressure of water at the temperature of the warm product (the "flash point"), water on and within the product begins to evaporate rapidly. The thermal energy required to provide the heat of vaporization of this water comes predominately from the sensible heat (e.g. "field heat") of the product. As a result, the product temperature begins to fall as rapid evaporation begins. Because vacuum pumps are generally very inefficient movers of condensable gases, such as water vapor, chilled coils are provided within the tube or chamber to condense and thereby remove the liberated water vapor. These coils are chilled usually by evaporation of liquid ammonia within, the ammonia being supplied by a conventional vapor-compression refrigeration unit.

In the absence of air or any other restriction to water vapor movement from the product to the chilled coil, the temperature of the product will in time equilibrate with that of the coil (the coil temperature in fact being commonly used as a control variable in vacuum cooling operations). Under these circumstances, the rate of thermal equilibration is largely determined by product characteristics. In general, products high in readily evaporated moisture content, with high thermal conductivity and high evaporative surface-to-volume ratio, will cool more rapidly under vacuum than do other types of products. For example, lettuce and other leafy vegetables cool well under vacuum (high moisture content and high surface-to-volume radio), while melons do not (low evaporation rate and low surface-to-volume ratio).

One example of a prior art vacuum cooling system is described in U.S. Pat. No. 4,576,014 to Miller, et al. In these approaches, water has been known to be added to the produce by sprinkling the produce before or while the vacuum is imposed to reduce the amount of moisture removed from the produce during cooling with the water evaporated during cooling being supplied at least in part by the water added to the system instead of entirely by the produce. In these approaches known to the inventor, the vacuum cooled produce sprinkled with water has been packed in waxed boxes which absorb very small amounts of water. This approach requires the use of water resistant containers for the produce.

Therefore, a need exists for a new cooling method for overcoming these and other disadvantages of the prior art.

SUMMARY OF THE INVENTION

In accordance with one aspect of the present invention, a method for cooling perishable food and horticultural products includes placing a cooling element with a liquid holding portion with the product and subjecting both the product and the cooling element to a vacuum. The liquid holding portion is of the type which readily releases liquid to evaporation. Under these conditions, evaporation of liquid, preferably water, from the liquid holding portion of the cooling element enhances the cooling of the products.

In accordance with a preferred embodiment, the cooling element comprises a sheet of liquid holding fibrous material, most preferably a wet-laid or air-laid sheet of wood pulp. The sheet may be used, for example, as a liner for a box or tray and/or between layers of produce in a box or other container. When exposed to a vacuum, liquid evaporates from the sheet to cool the sheet, which in turn cools the product.

In accordance with a specific aspect of the present invention, the liquid holding portion of the cooling element may comprise a hydrophilic material, such as a wood pulp sheet. To increase the water holding capacity of this material, a superabsorbent material such as a hydrogel may be incorporated into the cooling element.

The produce may be cooled while in a non-packaged state or after packaging the produce in containers. The produce containers may be sealed or unsealed. The containers may also be of a film or films or other material which controls the flow of oxygen and carbon dioxide between the interior and exterior thereof and may also have a water permeable portion so as to permit water vapor to pass from the interior to the exterior of the container.

Most preferably, the sheet may be used in conjunction with a box of corrugated board which is not waxed or otherwise surface treated to resist moisture. With a sheet of wood pulp as a cooling element and a non-waxed box, both the sheet and box may readily be re-pulped, thereby enhancing the recyclability of the packaging material.

Also, it is preferable to include water in the liquid cooling element in an amount which is preferably no more than about four percent by weight to the weight of the product. Although more water could be included, excess water remaining after vacuum cooling can interfere with product quality if not removed or separated from the product. Most preferably, the water is present in the cooling element in an amount of from about two percent to about four percent by weight to the weight of the product. When cooled in a vacuum, about one percent of the weight of the product would be evaporated (water from the product) for each 10° F. of cooling. By replacing much of this evaporated liquid with liquid evaporated from the cooling element, vacuum cooling of the product is accomplished while reducing the loss in product weight due to evaporation of water from the product.

To enhance the cooling rate, rather than saturating a sheet of water holding material or otherwise concentrating the water, it is preferable to disperse the water over a larger surface area. Therefore, interleaving water containing sheets with product, or otherwise dispersing the cooling element throughout the package, is preferred, especially when large boxes of product are being cooled.

The cooling element may include plural passageways open at at least one end through which gas may pass to enhance the rate of evaporation of liquid from the cooling element. In a specific example, the cooling element may be formed of a corrugated board having a fluted core and a fibrous mat on one surface thereof for purposes of absorbing liquid.

In one specific form, the cooling element comprises a fluted or corrugated core with a layer of a hydrophilic material at one side of the core. The hydrophilic material, which may comprise wood pulp or other suitable material, contains water for cooling by evaporation. The corrugations or flutes of the core provide paths for the flow of air and water vapor adjacent to the hydrophilic material to aid in the evaporation of moisture from the hydrophilic material, and thus the cooling of the product.

It is therefore an object of the present invention to enhance the vacuum cooling of products and the quality of vacuum cooled products.

The present invention relates to the above features, objects and advantages, both individually and collectively. These and other objects, features and advantages of the present invention will become apparent with reference to the following description and drawings.

DETAILED DESCRIPTION OF PREFERRED EMBODIMENTS

The method of cooling of the present invention is applicable to a wide variety of perishable food and horticultural products which are suitable for vacuum cooling. These products include, but are not limited to, respiring products, such as leafy vegetables (e.g. lettuce, both whole head and cut), cauliflower and celery.

The method of cooling involves the evaporation of a liquid from a cooling element in proximity to the product as the product is subjected to vacuum cooling.

Figure 1:
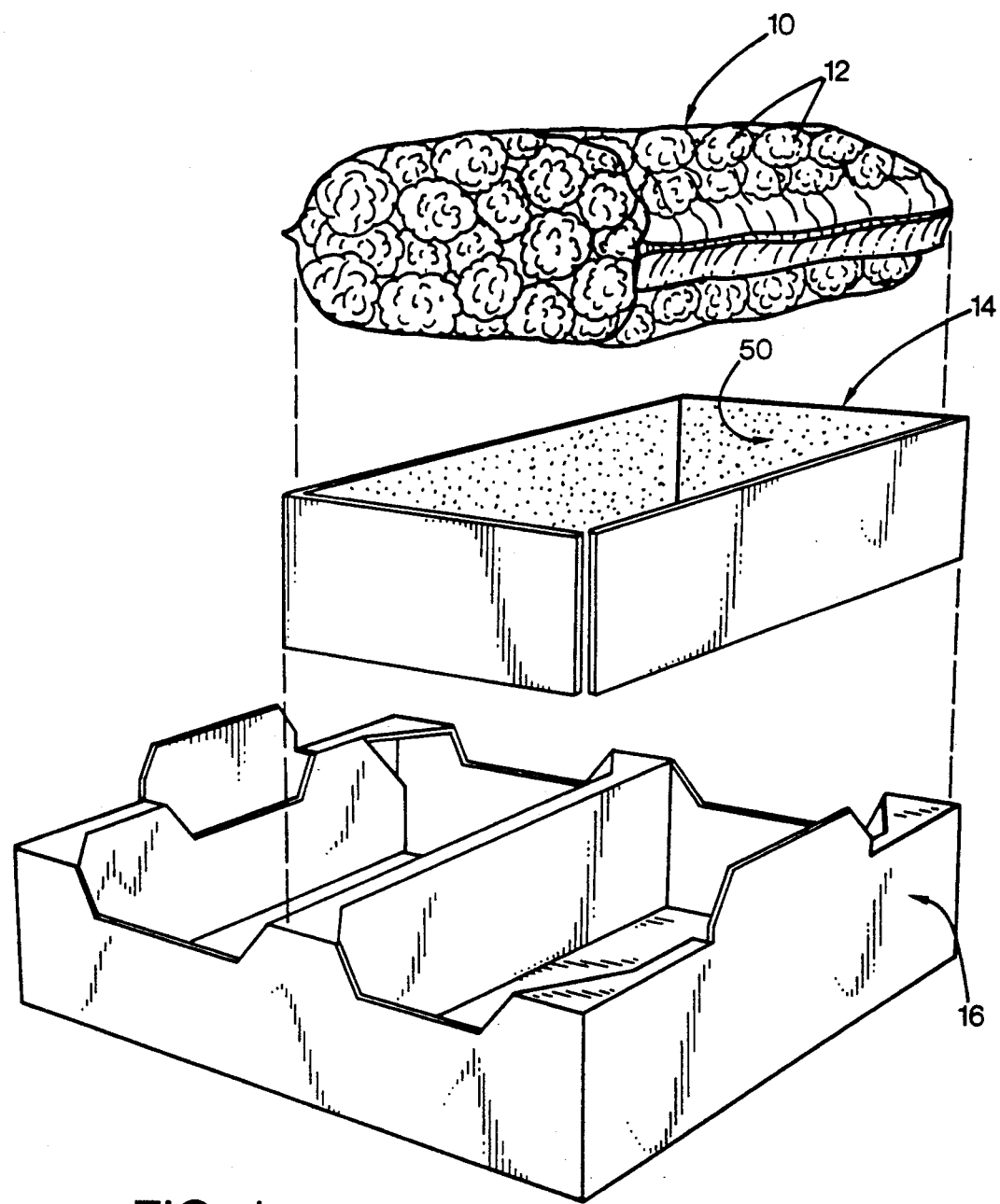
FIG. 1 illustrates one form of a liquid containing cooling element which is shown in position to receive and surround a perforated product container, in this case a container of cauliflower florets, which is then placed in a non-waxed corrugated box.

FIG. 1 illustrates one form of a separate cooling element which is capable of holding a volatile liquid, such as water, ethanol or the like, in proximity to the product or product container during vacuum cooling. Other approaches may also be used. For example, by making the product container of a hydrophilic material, such as of a cellulose based material (e.g. nylon, cellulose acetate, cellophane or other dissolved cellulose based films) or other absorbent material, the container itself may function as a cooling element with liquid evaporating from the container to facilitate the cooling of its contents. Polysaccharide films, hydrogels (such as the so-called superabsorbent particles common in the disposable diaper art) adhered to film, fibrous materials such as wood pulp adhered to the film, are yet other examples of mechanisms for placing liquid in proximity to, and preferably in contact with or adjacent to the product during vacuum cooling.

The required capacity of the moisture source, whether it be a substrate on the container or moisture holding substrate in a separate cooling element, depends upon the mass of the product within the package. With water being the cooling liquid, a rule of thumb indicates that one percent of the product mass is lost to evaporation for every 10° F. of vacuum cooling. To minimize evaporation of moisture from the product itself during vacuum cooling, the moisture source is typically designed to provide at least this minimum mass. However, excessive moisture remaining in contact with produce can result in harm to the quality of the cooled product. Therefore, to minimize the problem of excessive liquid, preferably the maximum weight of liquid (e.g. water) incorporated into the cooling element is six percent of the weight of the product. Most preferably, the weight of water in the cooling element is from two percent to six percent of the weight of the product. This water is readily evaporated from the cooling element during vacuum cooling.

To accommodate this relatively large quantity of moisture, the moisture is most conveniently placed in a substrate with the substrate being positioned in proximity of the produce or in the container wall of the packaged produce. Again, moisture absorbing material may be utilized, such as blotter pads, absorbent fluff pulp, superabsorbent polymers, paper, molded fiber and combinations thereof. The location of the moisture containing substrate with respect to the produce or produce container may be varied, such as underneath, along side, interleaved, or on top thereof.

To enhance the rate of evaporation, the surface area of the water retaining portion of the cooling element is sized so that the cooling element need not be saturated with liquid in any area thereof. Most preferably, the water containing cooling element has a surface area at one major surface (one side) thereof of from about five to about fifty square inches per pound of product and contains from about 0.001 to about 0.004 pounds of water per square inch of surface area. Cooling elements in the form of sheets maximize the available surface area of the cooling element. A specifically preferred sheet or mat is of wet-laid or air-laid NB 316 wood pulp, from Weyerhaeuser Company, at a basis weight of from about 50 to about 150 pounds per 1,000 square feet. Most preferably, such a sheet is wet-laid and has a basis weight of 90 pounds per 1,000 square ft. and a mat density of 36 pounds per cubic foot.

Figure 2:
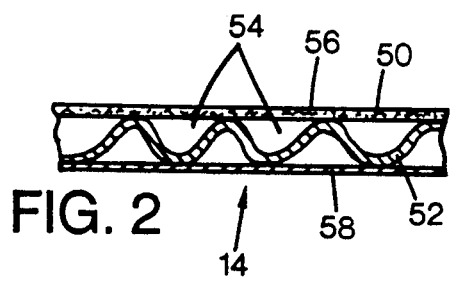
FIG. 2 illustrates a section of the specific cooling element of FIG. 1.

In the design of a cooling element, such in the form of a collar 14 shown in FIG. 1, the substrate material is indicated at 50 and is positioned at the interior of the collar 14. In FIG. 2, the water containing substrate 50 comprises a sheet which is positioned at a surface of the collar 14 and which is incorporated into the collar. Again, the sheet may be of any suitable liquid containing material, such as wood pulp. Also, as shown in FIG. 2, the collar 14 may include a conventional corrugated core, indicated at 52, such as of corrugated Kraft paper and a back 58 of conventional liner board or Kraft paper. The corrugations define passageways or flutes, some being indicated at 54 in FIG. 2, which permit the passage of air or otherwise expose the back side of the sheet 50. Consequently, evaporation of liquid from the back side of the sheet is enhanced. This can be important, especially if a container (e.g. container 10 in FIG. 1 of cauliflower florets) is pressing against the exposed surface 56 of the sheet so as to limit evaporation at the area of contact between the container and sheet.

Figure 3:
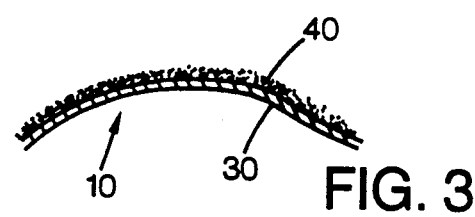
FIG. 3 illustrates an alternative form of cooling element.
Figure 5:
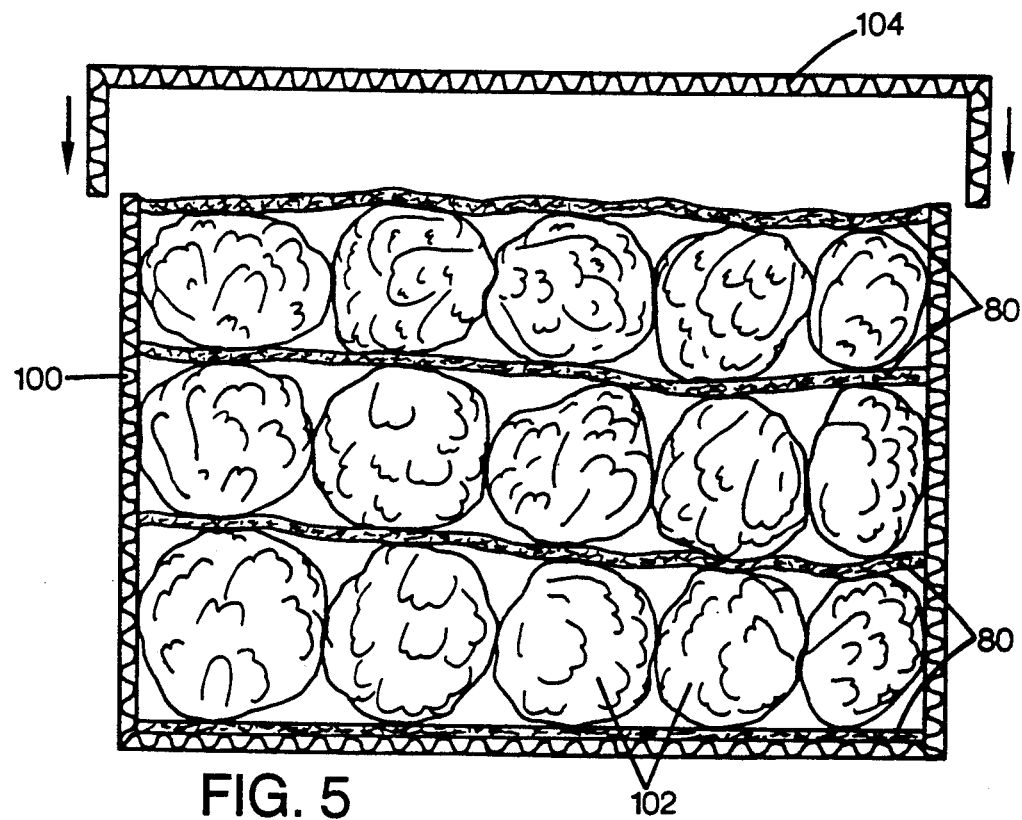
FIG. 5 illustrates a corrugated box with sheeted cooling elements dispersed, as by interleaving or layering between produce in the box.

The receptacle 16 may be a separate element as indicated at FIG. 1, and may be a simple box of corrugated board (see box 100 in FIG. 5). The box need not be waxed or otherwise rendered hydrophobic because the water containing liners or cooling elements do not transfer significant amounts of liquid to the box or receptacle. Consequently, the box or receptacle may readily be repulped to facilitate recycling. This compares to the extreme difficulty or commercial impracticality of repulping waxed boxes. The receptacle and cooling element may be combined, such as in the structure like that shown in FIG. 2. In such a case, the interior surface of the receptacle would comprise the water holding or carrying cooling element, such as the sheet 50. Alternatively, as shown in FIG. 3, the cooling element may simply be an absorbent layer 40, such as of wood pulp, adhered to a substrate 30 forming the container 10.

Figure 4:
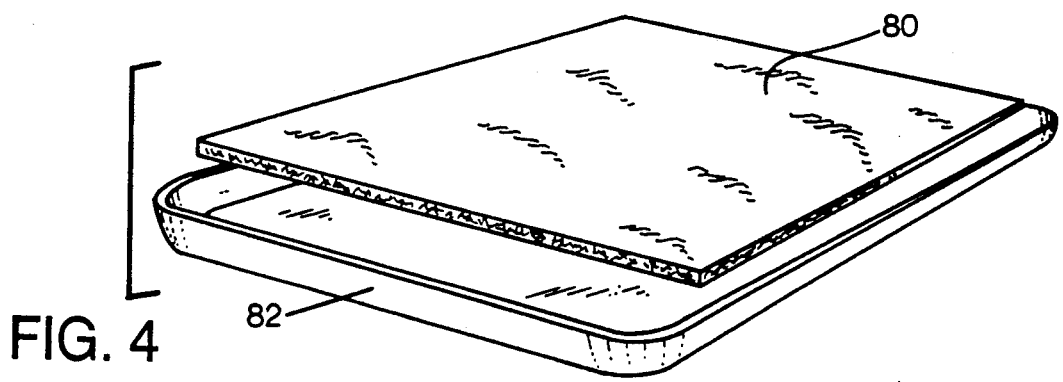
FIG. 4 illustrates a cooling element in the form of a fibrous sheet for positioning in a box or, in this case, a tray.

As shown in FIG. 4, the cooling element may comprise a fibrous sheet 80, such as of air-laid wood pulp, which is wetted with water (before or after placement) and placed in a tray 82 of any suitable material, such as plastic or densified wood pulp. The tray simply serves to support the cooling element sheet 80 and product placed on or in proximity to the sheet during vacuum cooling and potentially thereafter during transportation and display of the product for resale.

As shown in FIG. 5, the product, such as lettuce heads 102 or celery stalks, or other product to be cooled, may be placed in a corrugated box 100. Again, the box is preferably not waxed. In this case, the wet cooling elements, such as sheets 80, are in position between the layers of product. A lid 104 may be used to close the box. The box is typically perforated to allow the rapid transfer of air and water vapor from the box during vacuum cooling.

When a sealed film packaging is used for the container 10, it is also possible to charge the package with a desired gas environment. For example, the gas environment may be achieved by charging the vacuum chamber with a desired gas atmosphere having a gas balance which differs from air. The modified atmosphere within the container remains at the charged gas composition for a substantial period of time. For example, the atmosphere may be enriched in carbon dioxide. This charging gas will pass into the container and effectively precharge the chamber with gas of the desired environment. The charging gases may include a fumigant for destroying fungi, bacteria, insects and other pests that might otherwise damage the packaged product. A number of known fumigants can be used, such as methyl bromide gas for mite control to satisfy export requirements. In addition, gases such as carbon monoxide may be used to inhibit enzymes responsible for browning of lettuce and other products. Again, any number of suitable fumigants may be utilized, with other examples including sulfur dioxide and sulfite based materials. Other chemicals for these purposes may be added in liquid or solid form.

For leafy products such as lettuce or other products typically subjected to vacuum cooling (e.g. celery or cauliflower florets), the products are preferably either not surrounded by a container 10 or a container 10 is used which is perforated to permit rapid air flow through the container.

The product and accompanying water containing cooling element is placed in a conventional vacuum tube and subjected to a vacuum to evaporate water from the cooling element, and to a lesser extent from the product, to accelerate cooling of the product. Refrigeration coils are used to condense the evaporating liquid to accelerate the rate of evaporation and resulting cooling.

By including a wet cooling element with the product during vacuum cooling, a desired rapid cooling is achieved while minimizing the evaporative loss of liquid from the product. As a result, the product resists wilting and becoming limp during vacuum cooling.

More specifically, the liquid is free to more rapidly evaporate from the cooling element than the product upon the application of the vacuum. Consequently, the cooling element cools more rapidly than the product and accelerates the cooling of the product. This accelerated cooling is enhanced by positioning the cooling element in contact with the product because heat from the product is then transferred by conduction directly to the cooling element. Convection cooling also takes place and would predominate if the cooling element is spaced from the product.

Having illustrated and described the principles of our invention with reference to several preferred embodiments, it should be apparent to those of ordinary skill in the art that the invention may be modified in arrangement and detail without departing from such principles. We claim as our invention all such modifications which fall within the scope of the following claims.

We claim:

1. A method of vacuum cooling horticultural products comprising:
   placing the product in close proximity to a cooling element to which a volatile liquid is then or has been added; and
   subjecting the product and liquid containing cooling element to a vacuum in a defined space to evaporate liquid from the cooling element and cool the product.

2. A method according to claim 1 including the step of including water in the cooling element in a weight amount of from two percent to six percent of the product weight.

3. A method according to claim 1 including the step of including water in the cooling element in a weight amount of no more than six percent of the product weight.

4. A method of vacuum cooling horticultural products comprising:
   placing the product in contact with a fibrous sheet to which liquid is then or has been added; and
   subjecting the product and liquid containing cooling element to a vacuum in a defined space to evaporate liquid from the cooling element and cool the product.

5. A method according to claim 4 in which the placing step comprises the step of placing the product in contact with a fibrous sheet which comprises a wood pulp sheet to which liquid is then or has been added.

6. A method according to claim 4 in which the placing step comprises the step of interleaving plural fibrous cooling element sheets with the product.

7. A method of vacuum cooling horticultural products comprising:
   placing the product in close proximity to a liquid containing cooling element to which a volatile liquid is then or has been added;
   packing the product and cooling element in a non-waxed corrugated box; and
   subjecting the packed product and liquid containing cooling element to a vacuum in a defined space to evaporate liquid from the cooling element and cool the product.

8. A method of vacuum cooling horticultural products comprising:
   packing the product and at least one cooling element sheet to which a volatile liquid is then or has been added in a non-waxed corrugated box; and
   subjecting the packed product and at least one liquid containing cooling element to a vacuum in a defined space to evaporate liquid from the cooling element and cool the product.

9. A method according to claim 8 including the step of positioning plural cooling element sheets in the box.

10. A method of vacuum cooling horticultural products comprising:
    placing the product in contact with a cooling element having a major surface with an area which is from about five to about fifty square inches per pound of the product; and
    subjecting the product and liquid containing cooling element to a vacuum in a defined space to evaporate liquid from the cooling element and cool the product.

11. A method according to claim 10 in which the cooling element has from about 0.001 to about 0.004 pounds of water per square inch of major surface area.

12. A method according to claim 11 in which the cooling element is a wood pulp sheet having a basis weight of about 90 pounds per 1,000 square feet.

* * * * *